United States Patent
Zhang

(10) Patent No.: US 11,799,368 B2
(45) Date of Patent: Oct. 24, 2023

(54) VARNISH APPLICATOR FOR ELECTRIC MOTOR

(71) Applicant: Ford Motor Company, Dearborn, MI (US)

(72) Inventor: Xiaogang Zhang, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 112 days.

(21) Appl. No.: 17/567,445

(22) Filed: Jan. 3, 2022

(65) Prior Publication Data

US 2023/0216382 A1 Jul. 6, 2023

(51) Int. Cl.
| | |
|---|---|
| *H02K 15/12* | (2006.01) |
| *H02K 1/16* | (2006.01) |
| *H02K 3/30* | (2006.01) |
| *H02K 3/34* | (2006.01) |
| *H02K 3/12* | (2006.01) |
| *B05D 1/00* | (2006.01) |

(52) U.S. Cl.
CPC .............. *H02K 15/12* (2013.01); *B05D 1/002* (2013.01); *H02K 1/16* (2013.01); *H02K 3/12* (2013.01); *H02K 3/30* (2013.01); *H02K 3/345* (2013.01)

(58) Field of Classification Search
CPC ............ H02K 15/12; H02K 1/16; H02K 3/12; H02K 3/30; H02K 3/345; B05D 1/002; B05D 1/26; B05D 7/16; H01F 41/12
USPC ................. 310/45; 427/104; 118/320; 29/596
See application file for complete search history.

(56) References Cited

U.S. PATENT DOCUMENTS

| | | | | | |
|---|---|---|---|---|---|
| 2,524,885 | A | * | 10/1950 | Clokey | H02K 15/12 427/104 |
| 3,247,004 | A | * | 4/1966 | Dosser | H02K 15/12 118/316 |
| 3,355,309 | A | * | 11/1967 | Bender | H02K 15/12 427/195 |
| 4,559,698 | A | * | 12/1985 | Bair | H02K 15/12 427/104 |
| 5,474,799 | A | * | 12/1995 | Thigpen | H01F 41/127 118/313 |
| 6,301,773 | B1 | * | 10/2001 | Chemburkar | H02K 15/024 156/290 |
| 9,819,251 | B2 | | 11/2017 | Mabu | |
| 10,063,118 | B2 | * | 8/2018 | Yoshida | H02K 3/48 |
| 2009/0127943 | A1 | * | 5/2009 | Machida | H02K 3/34 29/596 |

FOREIGN PATENT DOCUMENTS

| | | | | | |
|---|---|---|---|---|---|
| JP | 06055119 | A | * | 3/1994 | ............ B05C 5/00 |
| JP | 4109223 | | | 7/2008 | |
| JP | 2017175762 | A | * | 9/2017 | ............ H02K 15/12 |
| JP | 6225624 | | | 11/2017 | |
| JP | 2020150611 | | | 9/2020 | |
| JP | 6868719 | | | 5/2021 | |
| WO | 2020216595 | | | 10/2020 | |

* cited by examiner

*Primary Examiner* — Burton S Mullins
(74) *Attorney, Agent, or Firm* — Burris Law, PLLC

(57) ABSTRACT

A varnish injection system includes a varnish injector including a base, a nozzle extending from the base, and a spacer disposed on the nozzle, and an electric motor including a stator, a wire, and an insulating layer between the stator and the wire. The nozzle is arranged to deposit varnish between the stator and the insulating layer. The nozzle and the stator define a gap therebetween when the spacer engages the stator.

20 Claims, 14 Drawing Sheets

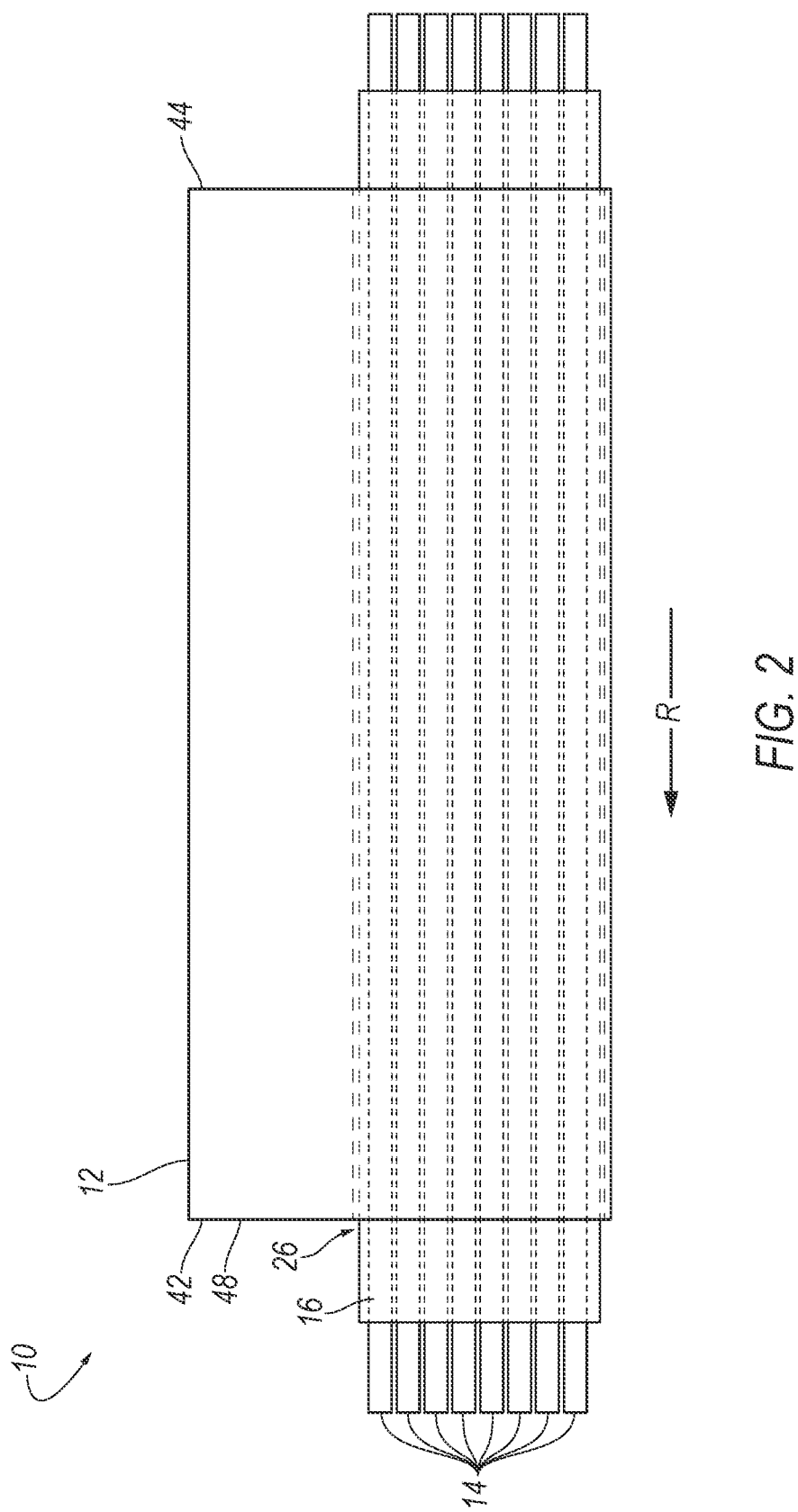

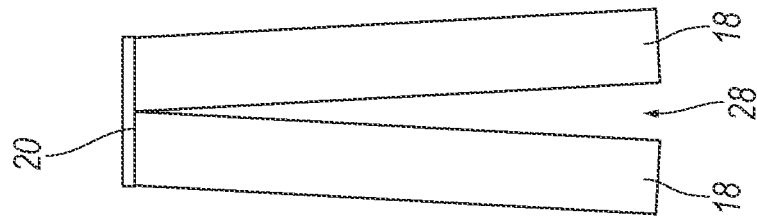
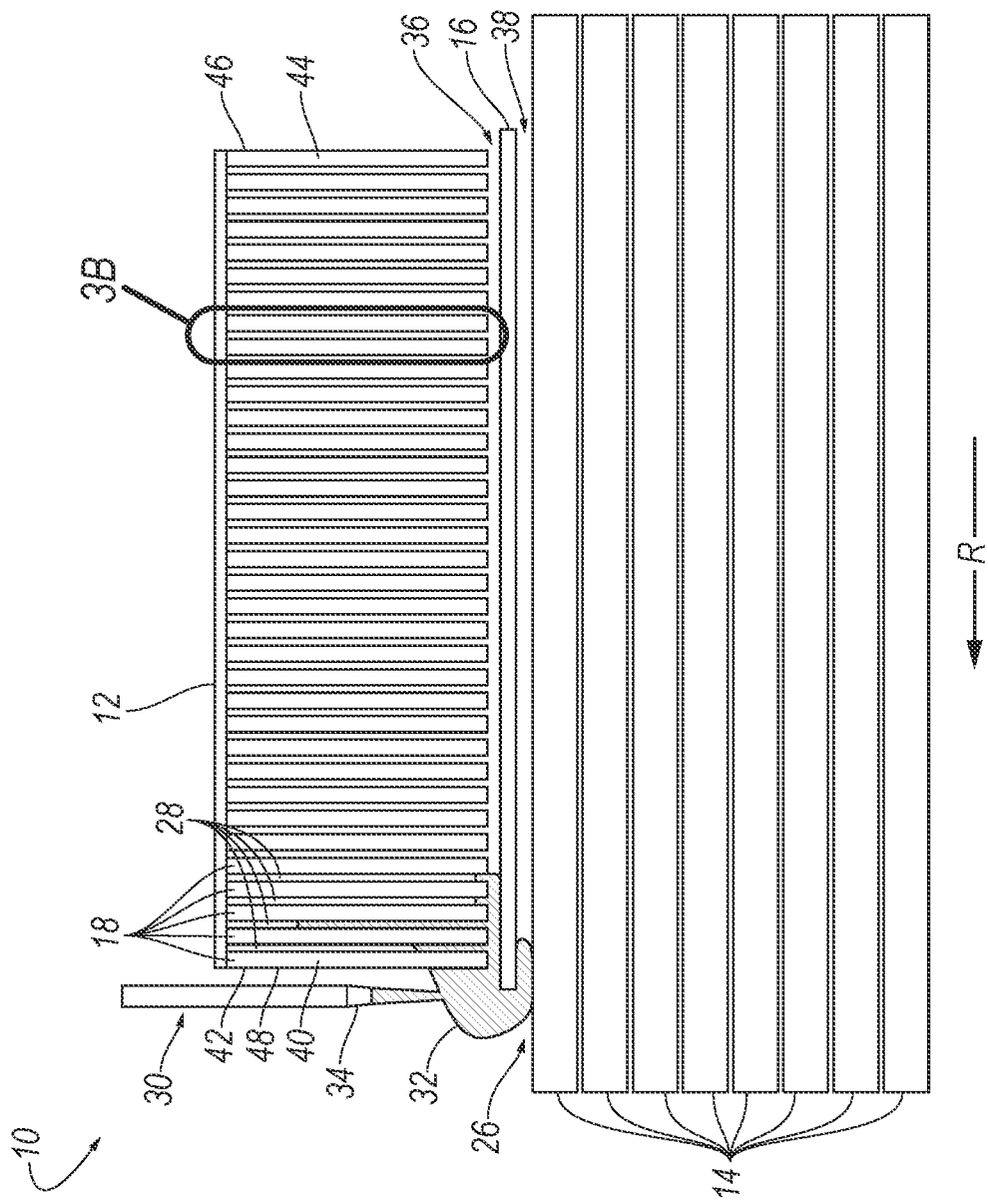
FIG. 3B
FIG. 3A

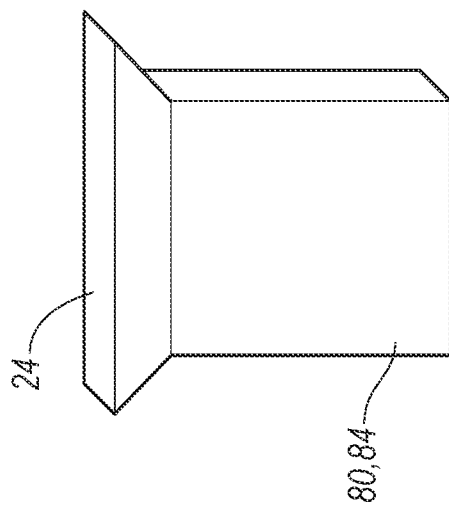
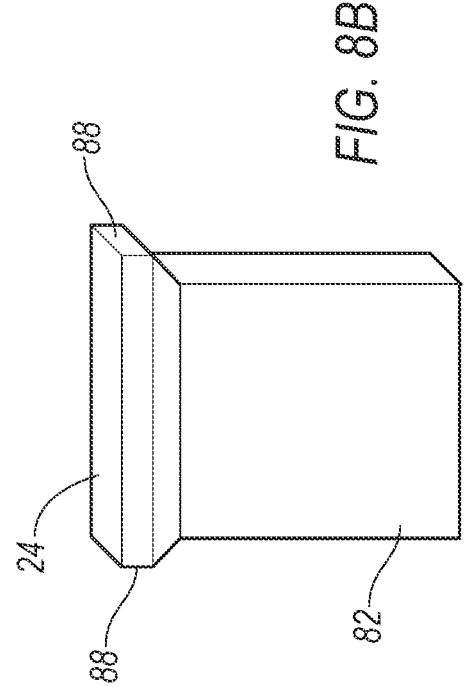
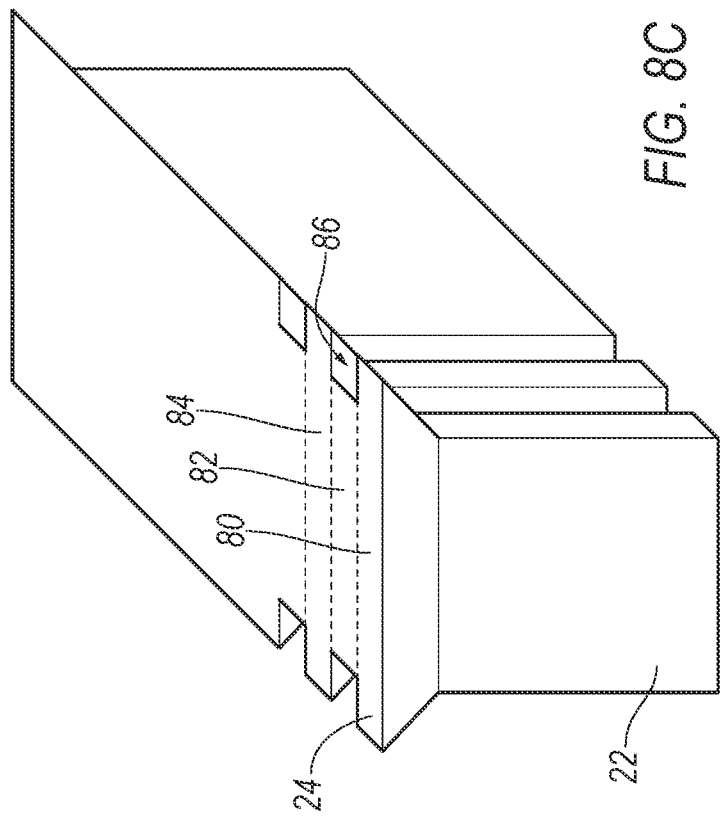

VARNISH APPLICATOR FOR ELECTRIC MOTOR

FIELD

The present disclosure relates to electric motors, and more particularly to maintenance of electric motor components.

BACKGROUND

The statements in this section merely provide background information related to the present disclosure and may not constitute prior art.

Electric propulsion in vehicles provide an alternative to internal combustion engines. The electric propulsions use electric motors to propel the vehicle. Applying varnish to such motors provides corrosion and contaminant resistance to the motors, increasing an operation lifetime of the electric propulsion. The varnish can be applied with a machine designed to apply the varnish to the various components of the motors.

The present disclosure addresses challenges related to varnish application to electric motors.

SUMMARY

This section provides a general summary of the disclosure and is not a comprehensive disclosure of its full scope or all of its features.

In one form, a varnish injection system includes a varnish injector including a base, a nozzle extending from the base, and a spacer disposed on the nozzle, and an electric motor including a stator, a wire, and an insulating layer between the stator and the wire. The nozzle is arranged to deposit varnish between the stator and the insulating layer. The nozzle and the stator define a gap therebetween when the spacer engages the stator.

In variations of the system of the above paragraph, which may be implemented individually or in any combination: the nozzle is further arranged to deposit varnish and between the insulating layer and the wire; the varnish injector further includes a spring urging the nozzle toward the base; the spacer engages the stator upon urging of the nozzle by the spring toward the base; the insulating layer is paper; the spacer is a ring having an inner diameter sized to frictionally fit about the nozzle; the spacer has an outer diameter sized to define the gap between the nozzle and the stator; the stator includes a pair of fingers defining a slot, and the wire is disposed in the slot; the spacer is a flexible material; the electric motor includes a plurality of wires radially spaced from each other, and the electric motor is rotatable to move each of the plurality of wires toward the nozzle; the spacer substantially maintains the gap when the electric motor is rotated; the electric motor includes a first wire and a second wire, and the electric motor is rotatable to move the first wire away from the nozzle and to move the second wire toward the nozzle.

In another form of the present disclosure, a method for applying varnish to an electric motor includes rotating the electric motor, urging a spacer against an outer surface of the electric motor, and actuating a nozzle disposed in the spacer to deposit varnish onto the electric motor through a gap between the nozzle and the electric motor.

In variations of the method of the above paragraph: the method further includes depositing the varnish between a stator of the electric motor and an insulating layer of the electric motor; depositing the varnish between an insulating layer of the electric motor and a wire of the electric motor; rotating the electric motor at a constant speed; moving a base in a radial direction of the electric motor to urge the spacer against the outer surface of the electric motor; the electric motor includes a stator and a wire, the stator includes a slot, the wire is disposed in the slot, and the method further comprises depositing the varnish into the slot between the stator and the wire.

In another form of the present disclosure, a system includes an electric motor including a stator, a wire, and an insulating layer disposed between the stator and the wire, the stator including a slot, and a varnish injector including a base, a nozzle extending from the base, a spring urging the nozzle toward the base, and a spacer disposed around the nozzle. The wire and the insulating layer are disposed in the slot of the stator. The nozzle and the stator define a gap therebetween when the spacer engages the stator upon urging by the spring and the nozzle is arranged to deposit varnish into the gap, the varnish flowing to a first space defined between the stator and the insulating layer and to a second space defined between the insulating layer and the wire.

In variations of the system of the above paragraph: the spacer engages an outer surface of the stator to define the gap.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a cross-sectional view of the electric motor;

FIG. 3A is a cross-sectional view a varnish injection system;

FIG. 3B is a detailed view of a pair of laminates of the stator shown in FIG. 3A;

FIG. 8A is a view of a distal end of one of the laminates of the stator;

FIG. 8B is a view of a distal end of one of the laminates with a chamfered edge;

FIG. 8C is a view of the stator with the laminates of FIGS. 8A-8B;

Figure 1:
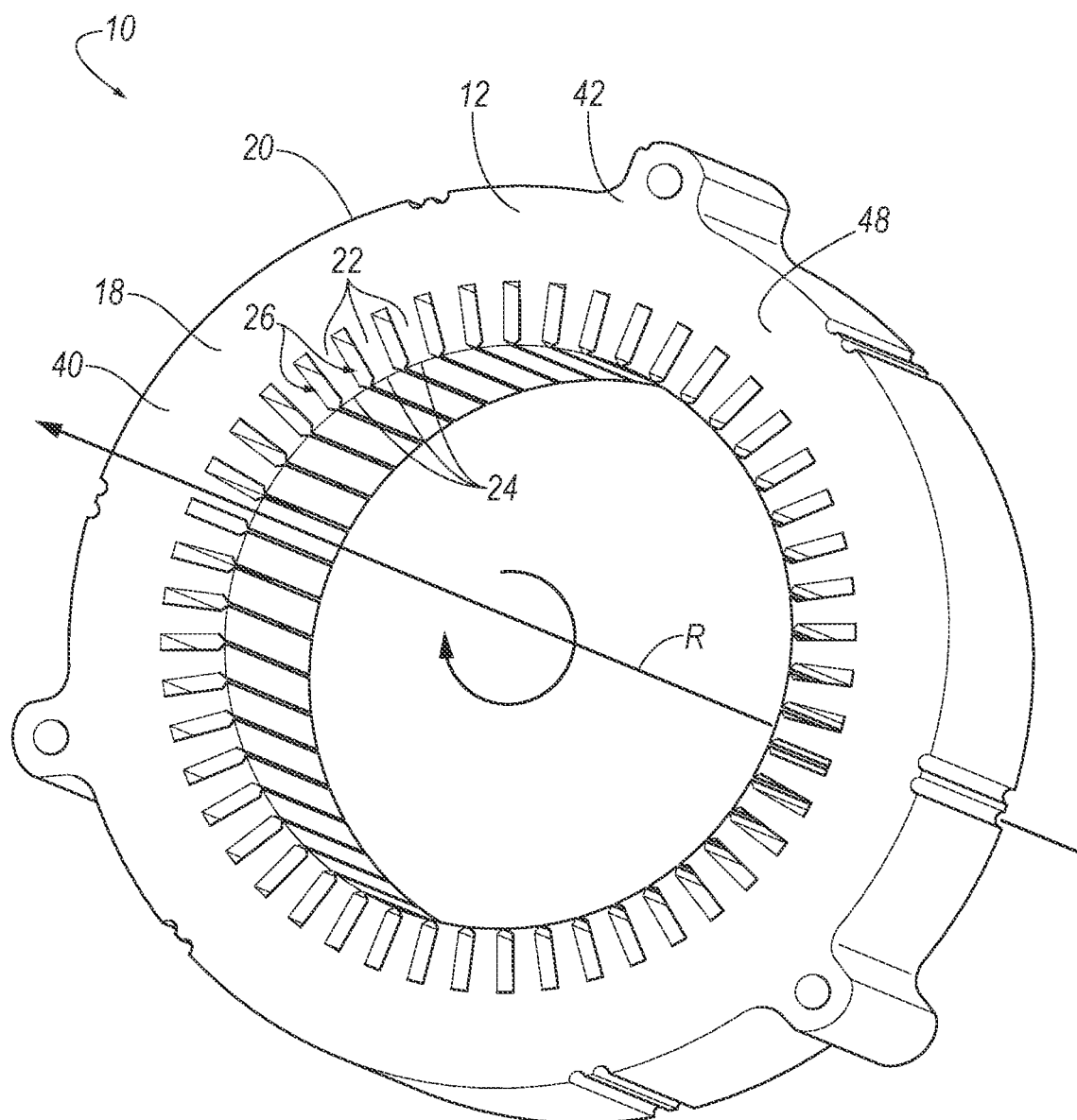
FIG. 1 is a perspective view of a stator of an electric motor.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1-3B, an electric motor 10 includes a stator 12, a plurality of wires 14, and an insulating layer 16 between the stator 12 and the wires 14. The electric motor 10 is a component of an electric propulsion for a motor vehicle, i.e., an "electric vehicle." The electric motor 10 propels the motor vehicle by rotating one or more wheels of the motor vehicle. In one example, the electric motor 10 is a sole propulsion of the vehicle, e.g., in a fully electric vehicle. Alternatively, the electric motor 10 can be part of a hybrid propulsion that includes an internal combustion engine, e.g., in a hybrid-electric vehicle.

The electric motor 10 includes the stator 12. The stator 12 is a stationary component of the electric motor 10 that provides a magnetic field by which a rotor (not shown) rotates. The stator 12 maintains alignment of the magnetic field to rotate the rotor. The stator 12 includes a plurality of laminates 18, i.e., sheets of material fused together. Each laminate 18 is an annular sheet of metal with a continuous outer edge 20 defining an outer diameter and a plurality of fingers 22 extending toward a center point of the annular sheet. Distal ends 24 of the fingers 22 define an inner diameter of the laminate 18. Each pair of adjacent fingers 22 of one of the laminates 18 defines a slot 26 therebetween. The slots 26 extend radially from the inner diameter to an intermediate diameter. The laminates 18 are fused at the outer diameter by, e.g., a weld, and the laminates 18 are free at the intermediate diameter and the inner diameter. Each pair of adjacent laminates 18 defines a space 28 there between, as shown in FIG. 3B.

With reference to FIGS. 2-3A, the electric motor 10 includes the plurality of wires 14. The wires 14 are an electrically conducting material, e.g., copper. The wires 14 provide electricity to generate the magnetic field that drives the rotor. The wires 14 are disposed in the slots 26 and extend along the stator 12. The wires 14 are disposed from the intermediate diameter to the inner diameter in the slots 26 defined by the fingers 22 of the laminates 18.

The electric motor 10 includes the insulating layer 16. The insulating layer 16 reduces or prevents electric conduction between the wires 14 and the stator 12, preventing interference with the magnetic field to rotate the rotor. The insulating layer 16 is, e.g., a paper layer that is electrically insulative. Each slot 26 of the stator 12 includes an insulating layer 16 disposed therein between respective wires 14 in the slot 26 and the stator 12.

With reference to FIG. 3A, a varnish injection system 30 provides varnish 32 to the stator 12, the insulating layer 16, and the wires 14. The varnish 32 protects the stator 12, the insulating layer 16, and the wires 14 from contaminants and corrosive materials that may affect operation of the electric motor 10. The varnish injection system 30 includes a nozzle 34 that provides the varnish 32. The varnish 32 moves via capillary action into a first gap 36 defined by the stator 12 and the insulating layer 16 and into a second gap 38 defined by the insulating layer 16 and the wires 14. The first and second gaps 36, 38 extend from a first laminate 40 at a first end 42 of the stator 12 to a last laminate 44 at a second end 46 of the stator 12. That is, the laminates 18 of the stator include a pair of laminates that define the outer surface of the stator. One of the pair is a "first" laminate 40, and the other of the pair is a "last" laminate 44.

The laminates 18 are stacked along a rotational axis R, and the gaps 36, 38 extend along each of the laminates 18 in the rotational axis R direction. By capillary action, the varnish 32 flows along the first and second gaps 36, 38 and into the spaces 28 between the laminates 18. However, the varnish 32 is typically more beneficial in the first and second gaps 36, 38, and less beneficial in the spaces 28 between the laminates 18. Thus, as described below, reducing the spaces 28 between the laminates 18 reduces a total amount of varnish 32 used and improves capillary action of the varnish 32 through the stator 12.

The laminates 18 may have uneven outer surfaces 48, and when the laminates 18 are stacked into the stator 12, the outer surface 48 of the stator 12 may have deviations from the stacking tolerances of these uneven outer surfaces 48. The uneven outer surface 48 of the stator 12 may interfere with deposition of the varnish 32, e.g., by contacting the nozzle 34 or disrupting a stream of varnish 32 entering the slots 26. To deposit varnish 32 without interference from the stator 12, the nozzle 34 can be spaced to a specified gap from the outer surface 48 of the stator 12. The gap can be a specified distance that will prevent the outer surface 48 of the stator 12 from interfering with the nozzle 34, e.g., 2 mm.

Figure 4:
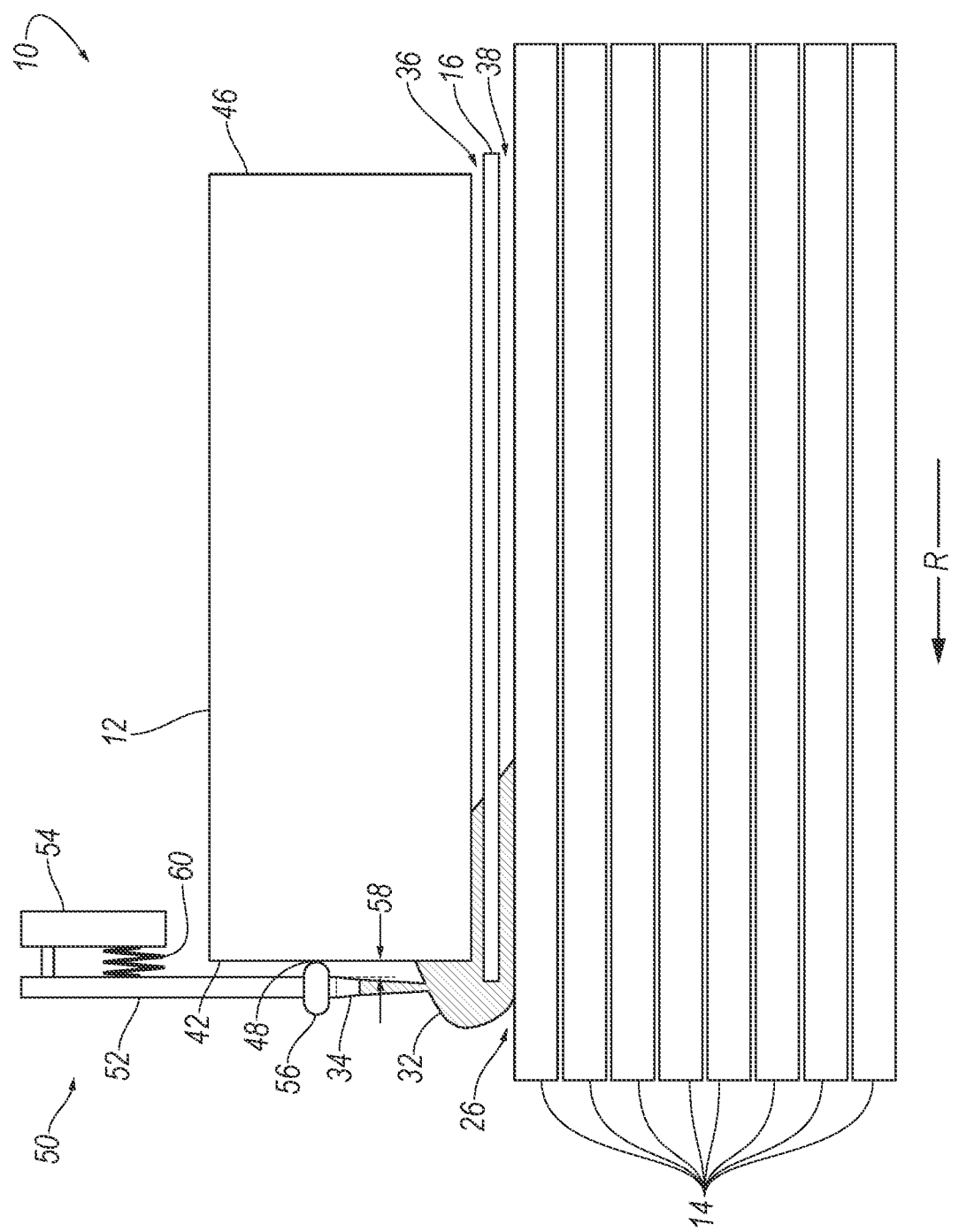
FIG. 4 is a side view of another varnish injection system including a spacer.

With reference to FIG. 4, a varnish injection system 50 includes a varnish injector 52, the varnish injector 52 including a base 54, a nozzle 34 extending from the base 54, and a spacer 56 disposed on the nozzle 34. The varnish injection system 50 of FIG. 4 provides varnish 32 to the electric motor 10 without interference from an uneven surface 48 of the stator 12, directing varnish 32 to the first and second gaps 36, 38 and reducing total varnish consumption during application.

The varnish injector 52 includes the base 54 and the nozzle 34 extending from the base 54. The base 54 is a structure that supports the nozzle 34 while the nozzle 34 deposits varnish 32 onto the electric motor 10. The nozzle 34 is arranged to deposit varnish 32 between the stator 12 and the insulating layer 16, and further arranged to deposit varnish 32 between the insulating layer 16 and the wires 14. The nozzle 34 extends downward toward the electric motor 10 to deposit the varnish 32.

The varnish injector 52 includes the spacer 56. The spacer 56 engages the outer surface 48 of the stator 12 to space the nozzle 34 from the stator 12. The spacer 56 prevents the nozzle 34 from moving toward the stator 12, defining a gap 58 between the nozzle 34 and the stator 12. As the uneven surface 48 of the stator 12 changes, the spacer 56 moves the nozzle 34 away from the stator 12 along the uneven deviations, allowing the nozzle 34 to deposit varnish 32 into the gap 58 and onto the stator 12. The spacer 56 is a ring fixed around the nozzle 34. The ring has an inner diameter sized to frictionally fit about the nozzle 34 and an outer diameter sized to define the gap 58. The spacer 56 is a flexible material, e.g., a polymer.

The varnish injector 52 includes a spring 60. To force the spacer 56 to engage the stator 12, the spring 60 provides an urging force that urges the spacer 56 toward the base 54 and onto the outer surface 48 of the stator 12. The spacer 56 engages the stator 12, generating tension in the spring 60. As the uneven surface 48 of the stator 12 changes, the spring 60 maintains its urging force, forcing the spacer 56 against the surface 48 of the stator 12 to position the nozzle 34 to deposit varnish 32 into the gap 58 between the nozzle 34 and the stator 12. In another form, the spring 60 urges the laminates 18 against each other, reducing spaces 28 between the laminates 18 and reducing capillary action of varnish 32 into the spaces 28. That is, the tension in the spring 60 is tuned to compress the laminates 18 together. In yet another form, a second varnish injection system (not shown) with a second spring compresses the opposing end of the stator 12, each spring providing tension to compress the laminates 18 and reduce the spaces 28 therebetween, reducing capillary action of the varnish 32 between the laminates 18.

As described above, the stator 12 includes a plurality of fingers 22, each pair of fingers 22 defining a slot 26 therebetween, and the wires 14 are radially spaced from each other in the slots 26. The electric motor 10 is rotatable about the rotational axis R to move each of the plurality of wires 14 toward the nozzle 34. The electric motor 10 rotates while the nozzle 34 applies varnish 32, and the spacer 56 substantially maintains the gap 58 when the electric motor 10 is rotated so that the varnish 32 is applied to all of the wires 14 of the electric motor 10. Specifically, the electric motor 10 is rotatable to move a first wire 14 away from the nozzle 34 and to move a second wire 14 toward the nozzle 34 so that the nozzle 34 can apply varnish 32 to the second wire 14 as the first wire 14 moves away from the nozzle 34. Thus, upon a complete rotation of the electric motor 10, the nozzle 34 applies varnish 32 to all of the slots 26 of the stator 12 and the wires 14 therein.

To apply the varnish 32 to the electric motor 10, the electric motor 10 is rotated until an angular position of the electric motor 10 is within a threshold of a specified angular position, the specified angular position determined to align the nozzle 34 with one of the wires 14 disposed in one of the slots 26. The base 54 is moved in a radial direction of the electric motor 10 to urge the spacer 56 against the outer surface 48 of the stator 12. The nozzle 34 is actuated to deposit varnish 32 through the gap 58 and into the slot 26 and the gaps 36, 38 therein.

Figure 5:
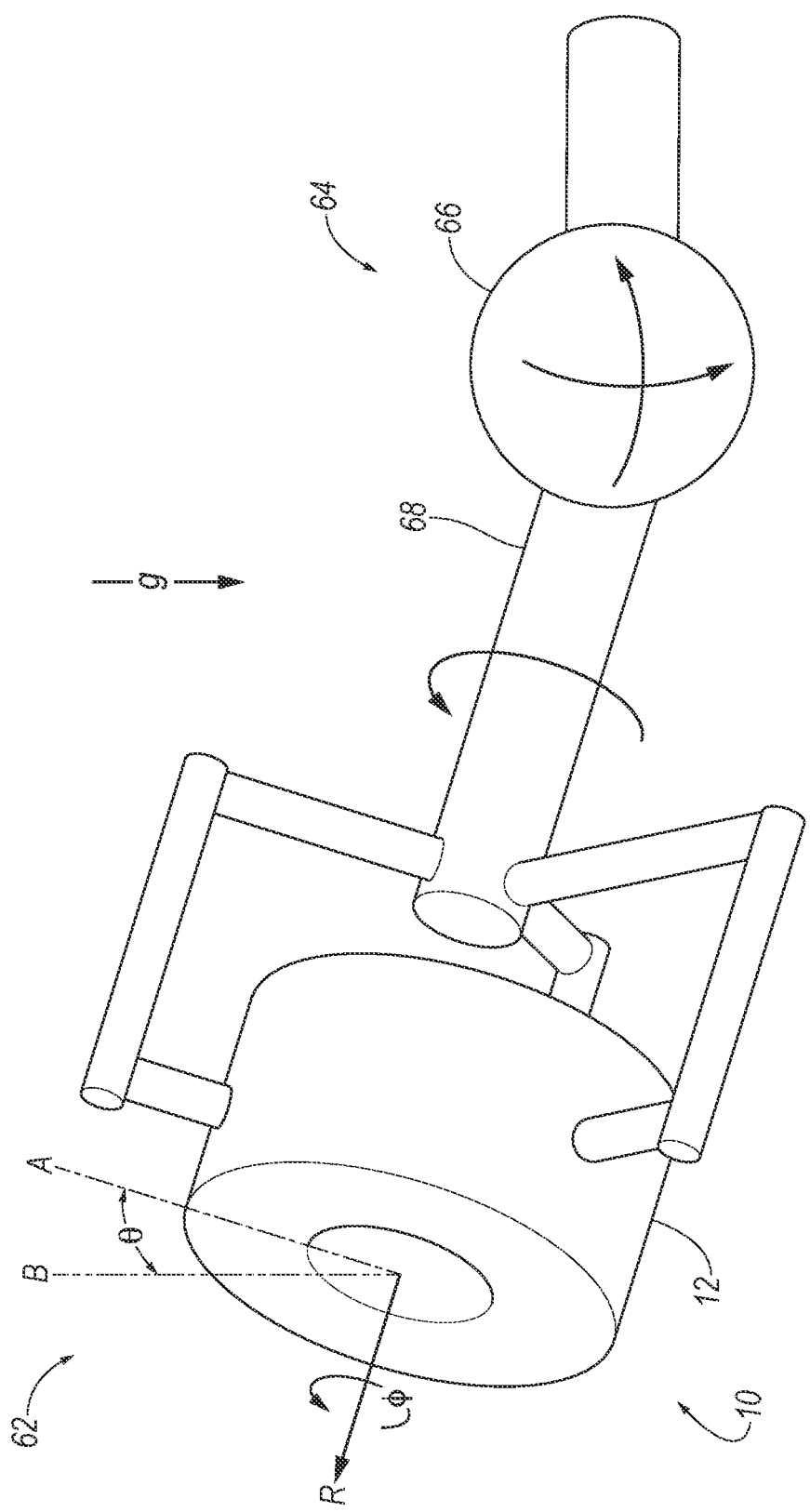
FIG. 5 is a perspective view of a rotatable mount that moves the electric motor.
Figure 6:
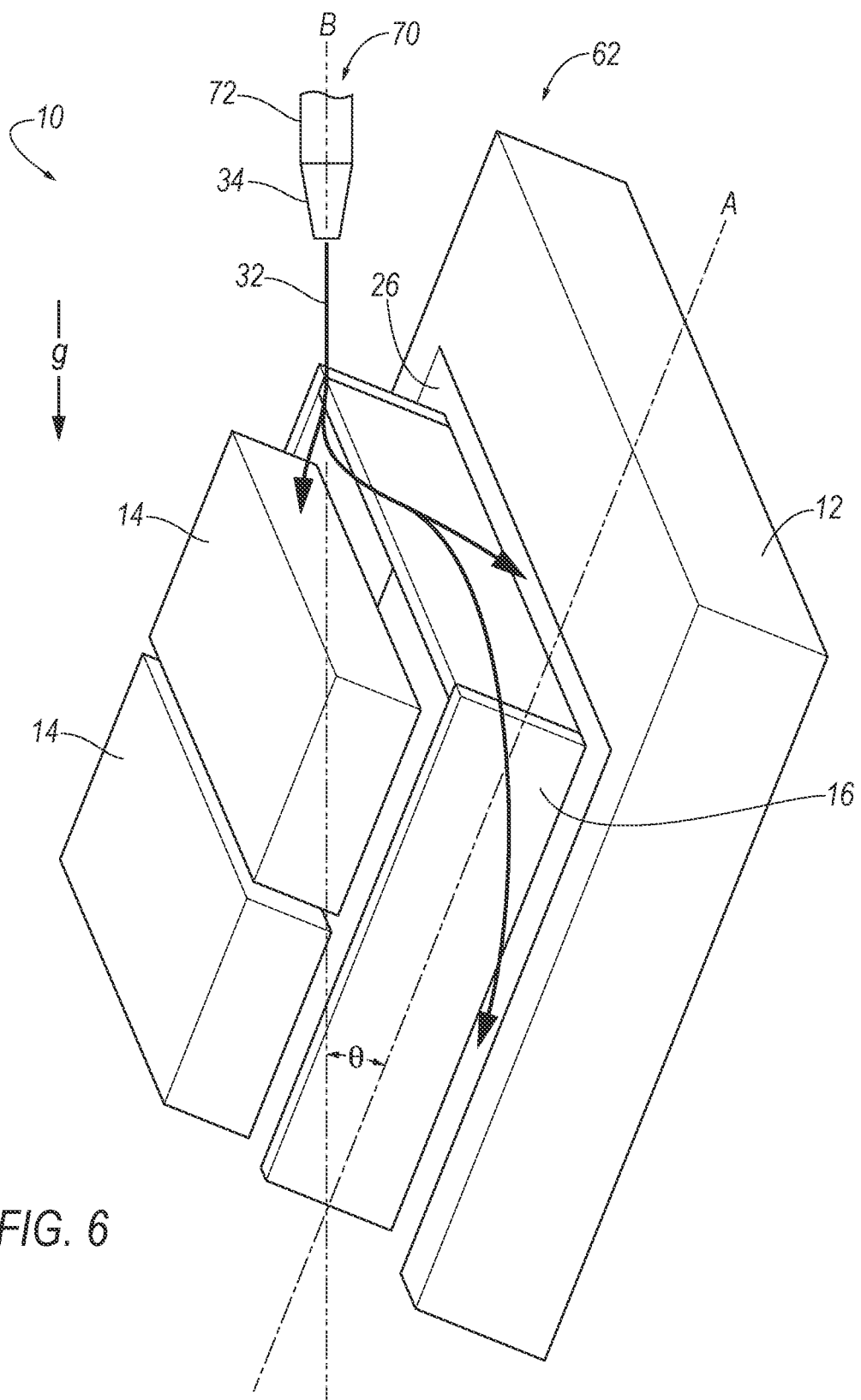
FIG. 6 is a perspective view of another varnish injection system applying varnish to a rotated electric motor.

With reference to FIGS. 5-6, another embodiment of the varnish injection system 62 includes a rotatable mount 64 that rotates the electric motor 10. The rotatable mount 64 supports the electric motor 10 and is movable about three axes of rotation. For example, the rotatable mount 64 includes a universal joint 66 and an arm 68 that connects the universal joint 66 and the electric motor 10. In another example not shown in the FIGS., the rotatable mount 64 includes a set of bevel gears to rotate the electric motor 10.

The electric motor 10 defines a rotational axis R about which the stator 12 rotates and a radial axis A along a radius of the stator 12. The universal joint 66 rotates the arm 68 and the electric motor 10 relative to a vertical axis B, i.e., an axis aligned with the direction of gravity, g. When the electric motor 10 is in a neutral position, the rotational axis R is perpendicular to the vertical axis B and the radial axis A is aligned with the vertical axis B. The rotatable mount 64 rotates the electric motor 10 about the rotational axis R to define an angle θ between radial axis A and the vertical axis B. When the electric motor 10 is rotated to define a nonzero angle θ between the radial axis A and the vertical axis B, varnish 32 flows with the assistance of gravity into the gaps 36, 38 defined between the stator 12, the wires 14, and the insulating layer 16.

The varnish injection system 62 of FIGS. 5-6 includes a varnish injector. The varnish injector 70 includes a base 72 and a nozzle 34 extending from the base 72. The nozzle 34 extends along the vertical axis B aligned with the direction of gravity, g. The nozzle 34 is arranged to deposit varnish 32 into the gaps 36, 38 defined between the stator 12 and the wire 14 when the rotatable mount 64 rotates the electric motor 10 to the nonzero angle θ, as shown in FIG. 6. The nozzle 34 deposits varnish 32 with the assistance of gravity, and the varnish 32 flows into the gaps 36, 38 via gravity and capillary action. When the electric motor 10 is rotated to the nonzero angle θ relative to the vertical axis B, the insulating layer 16 extends toward the nozzle 34 from the stator 12 and the wire 14 extends toward the nozzle 34 from the insulating layer 16.

The rotatable mount 64 rotates the electric motor 10 about the rotational axis R, and the varnish injection system 62 applies varnish 32 to the electric motor 10 as the electric motor 10 rotates. The electric motor 10 is rotatable to a specified angle 4) about the rotational axis R to align each slot 26 with the nozzle 34 of the varnish injector 70. The specified angle 4) is based on the number of slots 26 in the stator 12, the slots 26 being arranged substantially evenly about the stator 12. Each slot 26 is assigned a specified angle 4) relative to a neutral position, and the rotatable mount 64 is arranged to rotate the electric motor 10 to the specified angle 4) to align the respective slot 26 with the nozzle 34 to receive varnish 32. The rotatable mount 64 rotates the electric motor 10 to align a first slot 26 with the nozzle 34, and then rotates the electric motor 10 to align a next slot 26 upon deposition of varnish 32 to the first slot 26, and continues to rotate the electric motor 10 until each slot 26 has been aligned with the nozzle 34 to receive varnish 32. Thus, the rotatable mount 64 provides varnish 32 to each slot 26, each wire 14 within each slot 26, and to each insulating layer 16 in each slot 26.

To apply the varnish 32, the electric motor 10 is rotated to the specified nonzero angle θ between the radial axis A and the vertical axis B. The varnish injector 70 including the nozzle 34 extending along the vertical axis B is actuated to deposit varnish 32 into the slots 26. The electric motor 10 is rotated about the rotational axis R to apply the deposited varnish 32 onto each of the wires 14 disposed circumferentially around the stator 12. The varnish 32 is deposited into the gaps 36, 38 of each slot 26. The varnish injector 70 is deactivated upon completion of a full rotation of the electric motor 10 about the rotational axis R.

With reference to FIGS. 7A-10B, the plurality of laminates 18 are stacked along the rotational axis R and fused to form the stator 12. The circular laminates 18 include a plurality of fingers 22, each finger 22 having a distal end 24 extending toward a center point of the laminate 18. The fingers 22 define slots 26 therebetween, as described above, each slot 26 including a first wall 74, a second wall 76, and a floor 78 extending from the first wall 74 to the second wall 76.

Figure 7A:
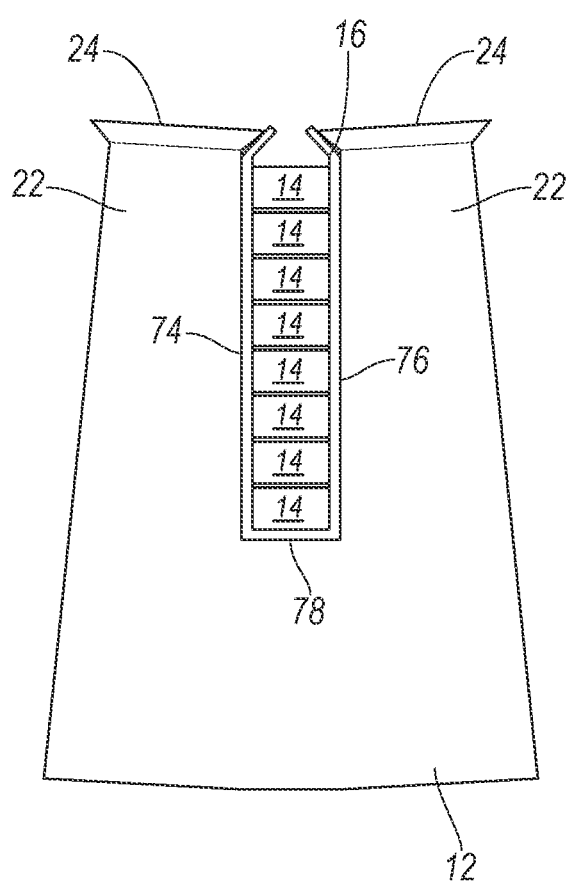
FIG. 7A is a cross-sectional view of the electric motor including the plurality of wires disposed in a slot.
Figure 7B:
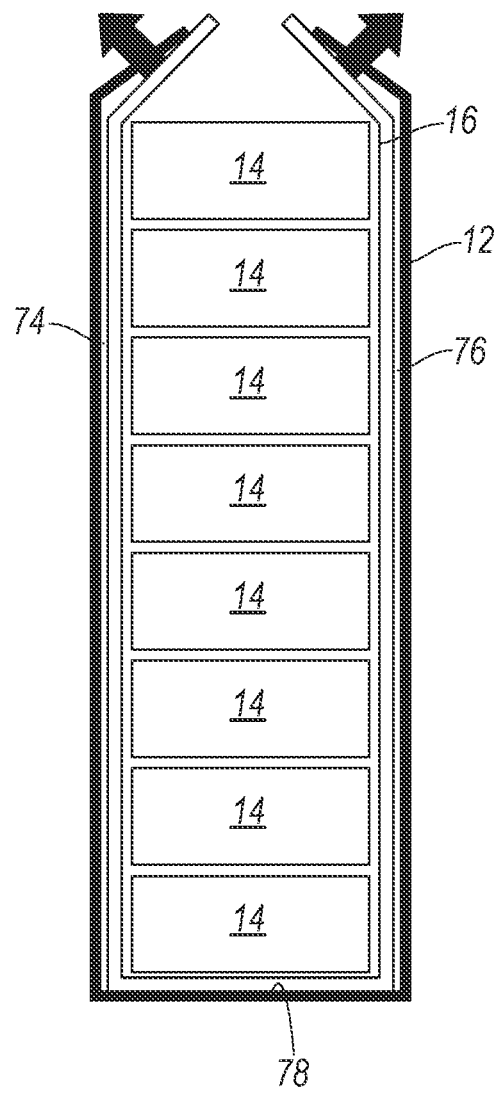
FIG. 7B is a cross-sectional view of the insulating layer and the plurality of wires contacting walls of the slot.

When the insulating layer 16 is disposed in the slot 26, the insulating layer 16 may block varnish 32 from flowing to the walls 74, 76 and the floor 78 of the slot 26. The rigidity of the paper of the insulating layer 16 and/or static forces can press the paper against the fingers 22 defining the slot 26, blocking the varnish 32 as shown in FIGS. 7A-7B. Thus, as shown in FIGS. 8A-10B, the laminates 18 and/or the insulating layer 16 can be modified to allow varnish 32 to flow onto the walls 74, 76 and the floor 78 of the slot 26.

With reference to FIGS. 8A-8C, three fingers 80, 82, 84 of three respective laminates 18 define a space 86 therebetween through which varnish 32 flows. FIG. 8A shows a distal end 24 of the first finger 80 and the third finger 84, and FIG. 8B shows a distal end 24 of the second finger 82. The distal end 24 of the second finger 82 has a chamfered edge 88, as shown in FIG. 8B. When the first, second, and third fingers 80, 82, 84 are stacked in the stator 12, as shown in FIG. 8C, the chamfered edge 88 of the second finger 82 forms the space 86 between the first and third fingers 80, 84. Each respective finger 80 of a first laminate 18 thus defines the space 86 with an adjacent finger 82 of a second laminate 18 and a subsequent finger 84 of a third laminate 18.

Figure 9A:
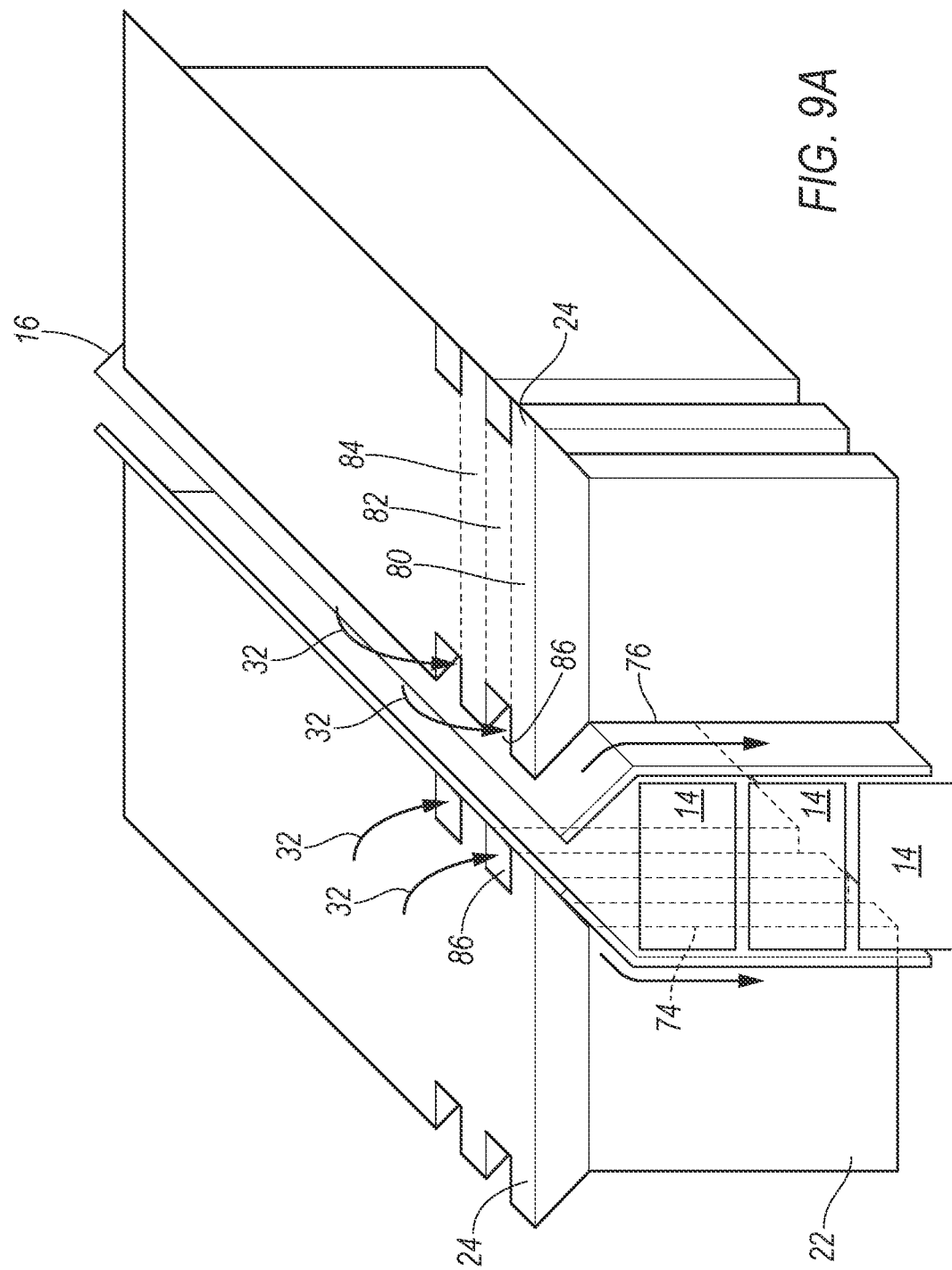
FIG. 9A is a view of the stator with the insulating layer and the plurality of wires disposed in the slot.
Figure 9B:
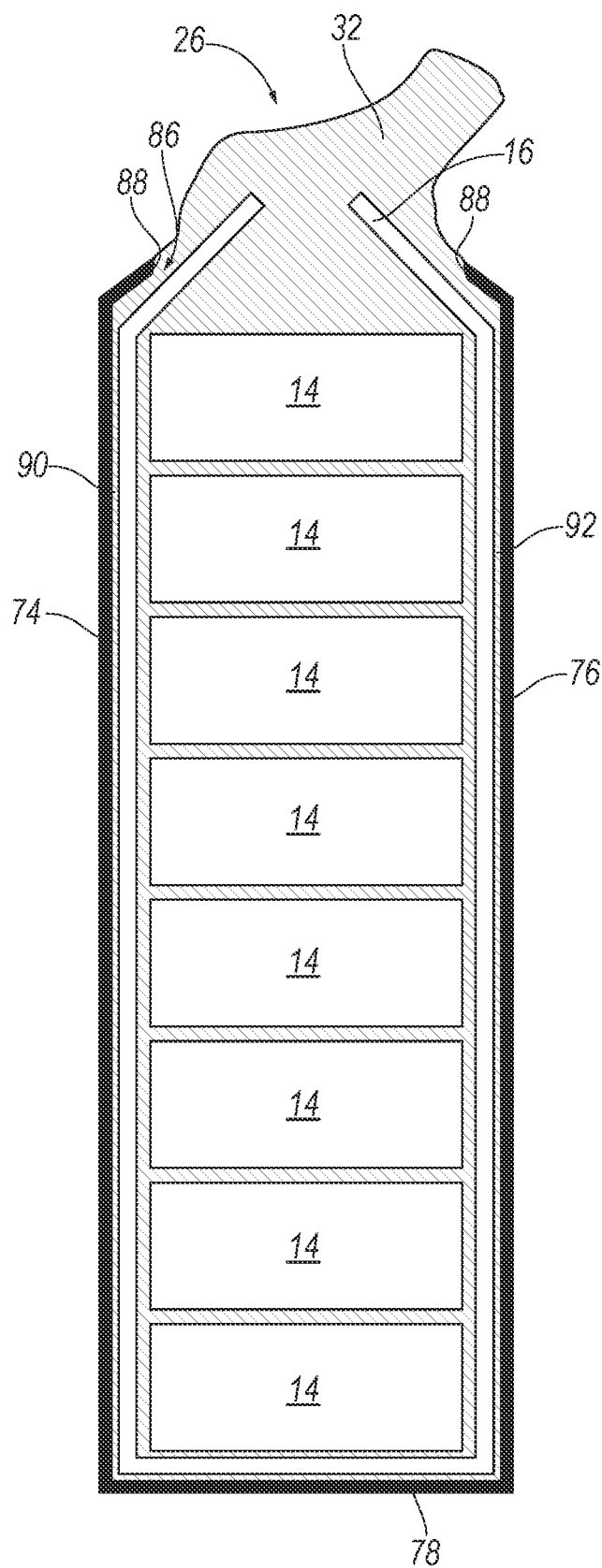
FIG. 9B is a cross-sectional view of the slot with injected varnish.

With reference to FIGS. 9A-9B, the space 86 between the first, second, and third fingers 80, 82, 84 allows varnish 32 to flow along the walls 74, 76 of the slot 26. The distal end 24 of the second finger 82 with the chamfered edge 88 is spaced from the insulating layer 16, and varnish 32 can flow through the space 86 into a gap 90 between the insulating layer 16 and the wall 74 and into the second gap 92 between the insulating layer 16 and the second wall 76. The electric motor 10 includes a plurality of insulating layers 16, each insulating layer 16 disposed in one of the slots 26 and extending between the respective walls 74, 76 defining the one of the slots 26, and the spaces 86 formed between each insulating layer 16 and each chamfered edge 88 allow varnish 32 to flow into each of the gaps 90, 92 between the insulating layer 16 and the walls 74, 76 of the slot 26.

Figure 10A:
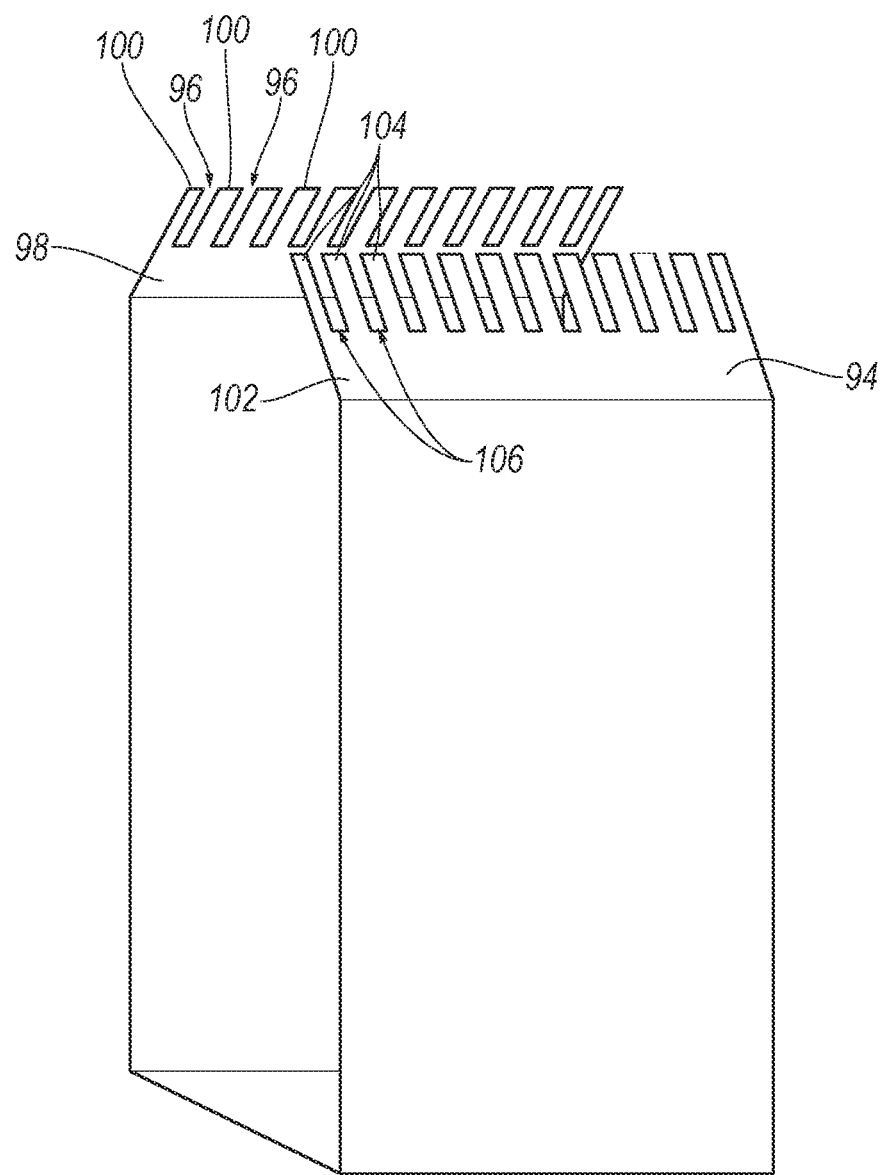
FIG. 10A is a view of the insulating layer.
Figure 10B:
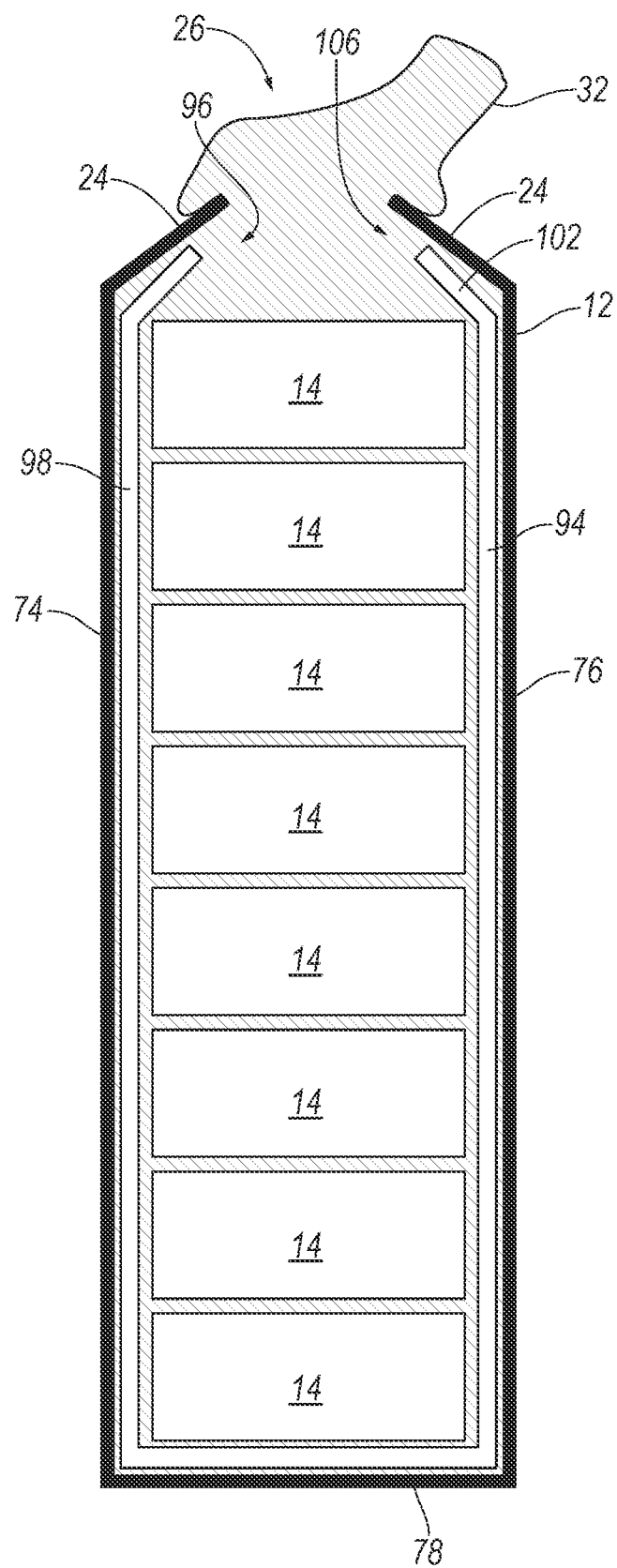
FIG. 10B is a cross sectional view of the slot with injected varnish.

Alternatively, as shown in FIGS. 10A-10B, the insulating layer 94 can include spaces 96 through which varnish 32 flows. In the example of FIG. 10A, the insulating layer 94 is a sheet that includes a top portion 98 and a plurality of fingers 100 extending from the top portion 98. The fingers 100 define respective spaces 96 therebetween adjacent fingers 100. The insulating layer 94 extends along a distal end of the first wall 74. The insulating layer 94 includes a second top portion 102 extending along the distal end of the second wall 76 of the slot 26. The second top portion 102 including a plurality of second fingers 104 defining respective second spaces 106 therebetween adjacent second fingers 104. The first and second fingers 100, 104 extend toward the center point of the stator 12. Thus, the insulating layer 94 defines gaps 90, 92 with the first and second walls 74, 76 that include the spaces 96 and the second spaces 106 defined by the fingers 100 and the second fingers 104, and, as shown in FIG. 10B, varnish 32 flows through the spaces 96 and the second spaces 106 and into the gaps 90, 92.

To apply the varnish 32, a varnish injector (such as one of the varnish injectors 52, 70 described above) is positioned above a gap 90, 92 between the insulating layer 94 and the adjacent wall 74, 76 of the stator 12. The gap 90, 92 is defined by a portion of the insulating layer 94 that is spaced from a portion of the adjacent wall 74, 76 of the stator 12. The varnish injector injects varnish 32 into the gap 90, 92 to the floor 78 between the walls 74, 76 and the insulating layer 94.

With reference to FIGS. 11A-11D, a clamp 108 is attached to the electric motor 10. The laminates 18 of the stator 12 define spaces 28 therebetween at the distal ends 24 of the fingers 22, and the clamp 108 compresses the laminates 18 to close the spaces 28, reducing movement of varnish 32 into the spaces 28. By closing the spaces 28 upon engagement with the electric motor, a varnish injector (such as the injectors 52, 70 described above) applies varnish 32 to the electric motor 10 with less varnish 32 entering into the spaces 28 where the varnish 32 may not be needed, and the capillary action of the varnish 32 through the slot 26 is improved.

Figure 11A:
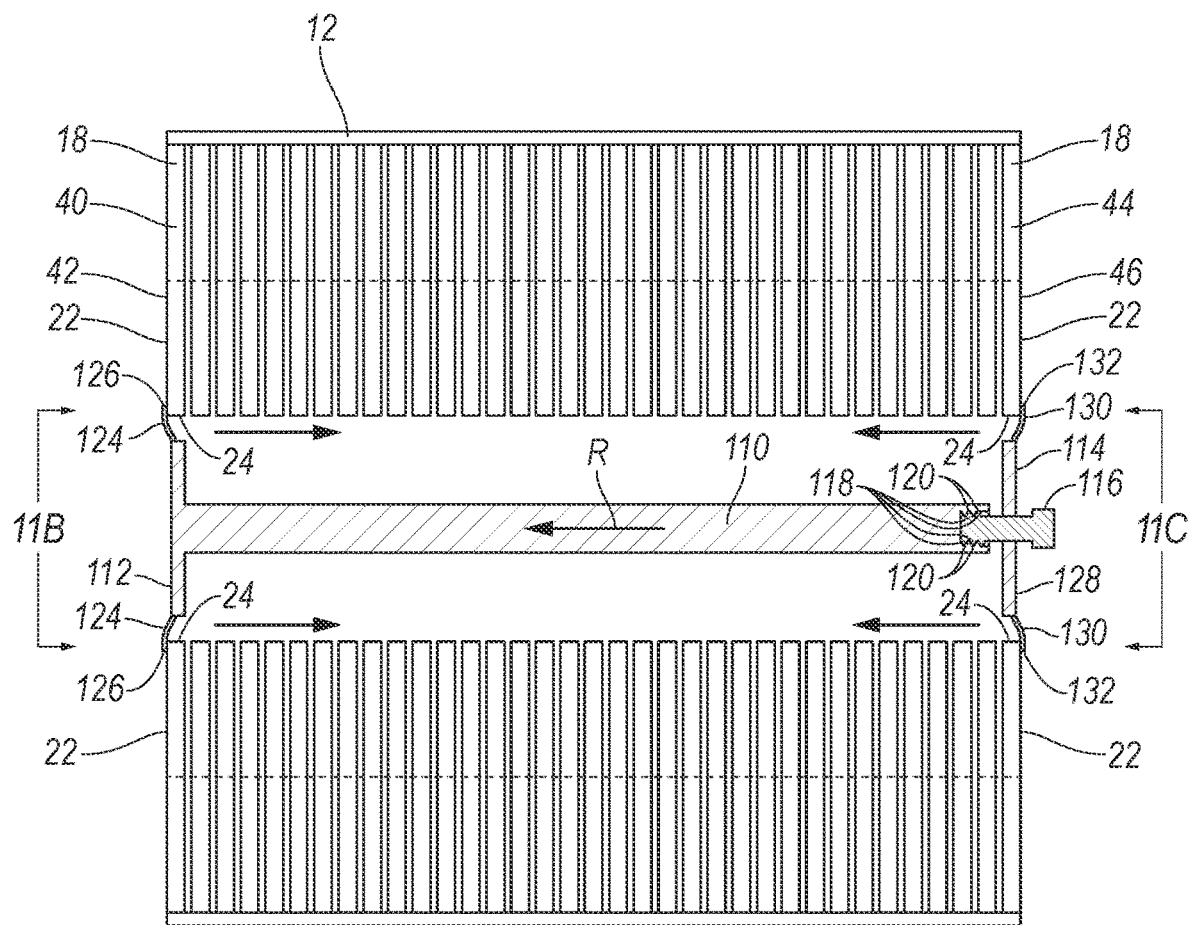
FIG. 11A is a side view of the electric motor with a clamp.

Referring to FIG. 11A, the clamp 108 includes a beam 110, a first end plate 112, and a second end plate 114. The beam 110 is a substantially straight member extendable along the rotational axis R of the electric motor 10. The first end plate 112 fixed to the beam 110 and engageable to the first end 42 of the stator 12. The second end plate 114 is releasably connected the beam 110 and engageable to the second end 46 of the stator 12. To attach the clamp 108 to the electric motor 10, the beam 110 is inserted into the electric motor 10 until the first end plate 112 engages the first end 42, and then the second end plate 114 is attached to the beam 110 at the second end 46. The beam 110 pulls the first end plate 112 toward the second end plate 114, compressing the laminates 18 of the stator 12 therebetween.

The first end plate 112 is engageable to the first laminate 40 of the stator 12. The second end plate 114 is engageable to the last laminate 44 of the stator 12. The first end plate 112 compresses respective distal ends 24 of the fingers 22 of the first laminate 40, and the second end plate 114 compresses respective distal ends 24 of the fingers 22 of the last laminate 44. The slots 26 of the stator 12 are disposed radially outward from a location at which the end plates 112, 114 engage the stator 12. By engaging the distal ends 24 of the fingers 22, the first and second end plates 112, 114 compress the laminates 18 at locations where the laminates 18 are elastically deformable, reducing the spaces 28 between the laminates 18 while leaving the slots 26 open to receive varnish 32.

The clamp 108 includes a fastener 116. The fastener 116 connects the second end plate 114 to the beam 110. The fastener 116 in the example of FIGS. 11A, 11C is a screw. The screw includes threads 118 that engage threads 120 of the beam 110, moving the screw into the beam 110. As the screw moves into the beam 110, the second end plate 114 moves toward the first end plate 112, compressing the laminates 18 of the stator 12 therebetween.

Figure 11B:
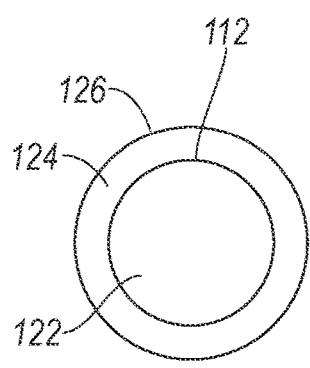
FIG. 11B is an end view of a first end plate of the clamp.
Figure 11C:
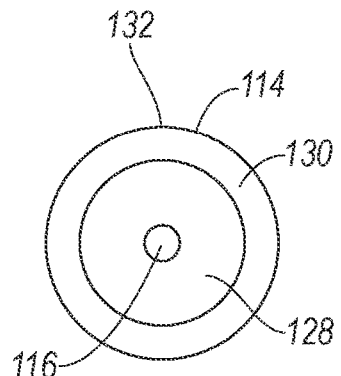
FIG. 11C is an end view of a second end plate of the clamp.
Figure 11D:
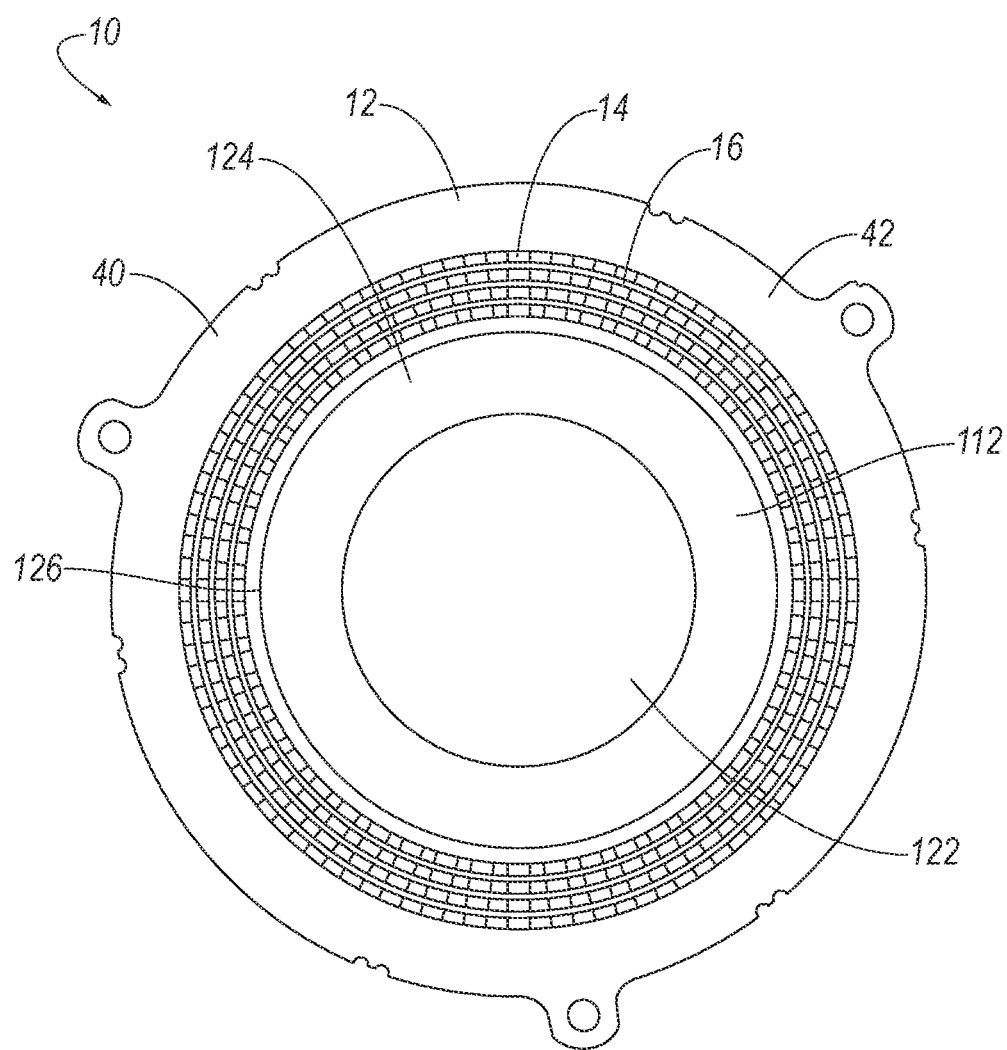
FIG. 11D is an end view of the electric motor and the clamp.

With reference to FIGS. 11B, 11D, the first end plate 112 includes a rigid inner portion 122 and a flexible annular portion 124. The flexible annular portion 124 extends from the rigid inner portion 122 to the electric motor 10. The flexible annular portion 124 includes an outer edge 126 that engages the stator 12. The second end plate 114 includes a rigid inner portion 128 and a flexible annular portion 130 including an outer edge 132 that engages the stator 12. Alternatively, the first and second end plates 112, 114 are entirely rigid, entirely flexible, or another combination of a rigid material and a flexible material.

A varnish injector deposits varnish 32 to the electric motor 10 when the clamp 108 engages the electric motor 10. The varnish injector is arranged to inject varnish 32 along the slots 26 defined by the compressed laminates 18. As described above, the varnish injector is arranged to inject the varnish 32 into the gap 36 between the stator 12 and the insulating layer 16 disposed in the slot 26 and into the gap 38 between the insulating layer 16 and the wire 14. The compressed laminates 18 improve capillary action in the gap 36 between the stator 12 and the insulating layer 16 because there are fewer spaces 28 to decrease surface tension of the flowing varnish 32.

To apply the varnish 32, the beam 110 is inserted through the cavity of the electric motor 10 to apply the first end plate 112 to the first end 42 of the stator 12. The second end plate 114 is applied to the second end 46 of the stator 12 and secured to the beam 110 with the removable fastener 116.

The first and second end plates 112, 114 compress the stator 12 therebetween upon rotation of the removable fastener 116 into the beam 110, moving the first end plate 112 toward the second end plate 114. A varnish injector applies the varnish 32 to the slot 26 until the varnish 32 reaches the second end 46 of the stator 12.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A varnish injection system comprising:
    a varnish injector including a base, a nozzle extending from the base, and a spacer disposed on the nozzle; and
    an electric motor including a stator, a wire, and an insulating layer between the stator and the wire,
    wherein the nozzle is arranged to deposit varnish between the stator and the insulating layer, and
    wherein the nozzle and the stator define a gap therebetween when the spacer engages the stator.

2. The varnish injection system according to claim 1, wherein the nozzle is further arranged to deposit varnish between the insulating layer and the wire.

3. The varnish injection system according to claim 1, wherein the varnish injector further includes a spring urging the nozzle toward the base.

4. The varnish injection system according to claim 3, wherein the spacer engages the stator upon urging of the nozzle by the spring toward the base.

5. The varnish injection system according to claim 1, wherein the insulating layer is paper.

6. The varnish injection system according to claim 1, wherein the spacer is a ring having an inner diameter sized to frictionally fit about the nozzle.

7. The varnish injection system according to claim 6, wherein the spacer has an outer diameter sized to define the gap between the nozzle and the stator.

8. The varnish injection system according to claim 1, wherein the stator includes a pair of fingers defining a slot, and the wire is disposed in the slot.

9. The varnish injection system according to claim 1, wherein the spacer is a flexible material.

10. The varnish injection system according to claim 1, wherein the electric motor includes a plurality of wires radially spaced from each other, and the electric motor is rotatable to move each of the plurality of wires toward the nozzle.

11. The varnish injection system according to claim 10, wherein the spacer substantially maintains the gap when the electric motor is rotated.

12. The varnish injection system according to claim 10, wherein the electric motor includes a first wire and a second wire, and the electric motor is rotatable to move the first wire away from the nozzle and to move the second wire toward the nozzle.

13. A method for applying varnish to an electric motor, the method comprising:
    rotating the electric motor;
    urging a spacer against an outer surface of the electric motor; and
    actuating a nozzle disposed in the spacer to deposit varnish onto the electric motor through a gap between the nozzle and the electric motor.

14. The method according to claim 13, further comprising depositing the varnish between a stator of the electric motor and an insulating layer of the electric motor.

15. The method according to claim 13, further comprising depositing the varnish between an insulating layer of the electric motor and a wire of the electric motor.

16. The method according to claim 13, further comprising rotating the electric motor at a constant speed.

17. The method according to claim 13, further comprising moving a base in a radial direction of the electric motor to urge the spacer against the outer surface of the electric motor.

18. The method according to claim 13, wherein the electric motor includes a stator and a wire, the stator includes a slot, the wire is disposed in the slot, and the method further comprises depositing the varnish into the slot between the stator and the wire.

19. A system comprising:
    an electric motor including a stator, a wire, and an insulating layer disposed between the stator and the wire, the stator including a slot; and
    a varnish injector including a base, a nozzle extending from the base, a spring urging the nozzle toward the base, and a spacer disposed around the nozzle,
    wherein the wire and the insulating layer are disposed in the slot of the stator, and
    wherein the nozzle and the stator define a gap therebetween when the spacer engages the stator upon urging by the spring and the nozzle is arranged to deposit varnish into the gap, the varnish flowing to a first space defined between the stator and the insulating layer and to a second space defined between the insulating layer and the wire.

20. The system according to claim 19, wherein the spacer engages an outer surface of the stator to define the gap.

* * * * *